(12) United States Patent
Kurozuka et al.

(10) Patent No.: US 9,690,094 B2
(45) Date of Patent: Jun. 27, 2017

(54) OPTICAL DEVICE AND MANUFACTURING METHOD THEREOF

(71) Applicant: Panasonic Intellectual Property Management Co., Ltd., Osaka (JP)

(72) Inventors: Akira Kurozuka, Osaka (JP); Akihiro Morikawa, Osaka (JP); Toshiaki Horie, Osaka (JP); Shinsuke Nakazono, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/898,722

(22) PCT Filed: Jan. 30, 2015

(86) PCT No.: PCT/JP2015/000414
§ 371 (c)(1),
(2) Date: Dec. 15, 2015

(87) PCT Pub. No.: WO2015/136830
PCT Pub. Date: Sep. 17, 2015

(65) Prior Publication Data
US 2016/0131895 A1 May 12, 2016

(30) Foreign Application Priority Data

Mar. 13, 2014 (JP) .............................. 2014-049638

(51) Int. Cl.
*G02B 26/08* (2006.01)
*G02B 26/10* (2006.01)
*G02B 27/00* (2006.01)

(52) U.S. Cl.
CPC ....... *G02B 26/105* (2013.01); *G02B 26/0858* (2013.01); *G02B 27/0006* (2013.01)

(58) Field of Classification Search
CPC .......... G02B 26/08; G02B 26/10; G02B 5/08; G02B 21/00; G02B 27/0006; H04N 9/31;
(Continued)

(56) References Cited

U.S. PATENT DOCUMENTS 4,898,035 A 2/1990 Yajima et al.
6,556,333 B2 4/2003 Tokuda et al.
(Continued)

FOREIGN PATENT DOCUMENTS

JP 01-182729 A 7/1989
JP 2002-040354 A 2/2002
(Continued)

OTHER PUBLICATIONS

International Search Report and Written Opinion issued in International Application No. PCT/JP2015/000414 dated Mar. 3, 2015, with partial English translation.
(Continued)

*Primary Examiner* — Euncha Cherry
(74) *Attorney, Agent, or Firm* — McDermott Will & Emery LLP

(57) ABSTRACT

An optical device includes: an optical element having an optically functional surface which is pivotable; a base supporting the optical element; and a package housing the optical element and the base, in which the package includes: a wall that surrounds the optical element and the base; a window that closes a first opening defined by the wall, and forms an optical path to the optically functional surface, the window being transmissive to light; and a bottom plate that closes a second opening defined by the wall.

20 Claims, 5 Drawing Sheets

(58) Field of Classification Search
CPC ... H04N 3/08; H04N 3/30; B81B 3/00; B81B 7/0058
USPC .......................................... 359/198.1–226.1
See application file for complete search history.

(56) References Cited

U.S. PATENT DOCUMENTS

| | | | |
|---|---|---|---|
| 7,282,393 | B2 | 10/2007 | Tarn |
| 7,402,878 | B2 | 7/2008 | Tarn |
| 7,449,773 | B2 | 11/2008 | Tarn |
| 7,872,338 | B2 | 1/2011 | Tarn |
| 8,803,936 | B2 | 8/2014 | Adachi et al. |
| 9,056,764 | B2 | 6/2015 | Tarn |
| 9,151,949 | B2 | 10/2015 | Hofmann et al. |
| 2002/0017563 | A1 | 2/2002 | Tokuda et al. |
| 2002/0097952 | A1* | 7/2002 | Jin ................. G02B 26/0841 359/872 |
| 2004/0232535 | A1 | 11/2004 | Tarn |
| 2004/0238600 | A1 | 12/2004 | Tarn |
| 2004/0263938 | A1 | 12/2004 | Mun et al. |
| 2005/0157374 | A1 | 7/2005 | Tarn |
| 2005/0185248 | A1 | 8/2005 | Tarn |
| 2005/0243396 | A1 | 11/2005 | Fujii et al. |
| 2006/0139713 | A1 | 6/2006 | Yee et al. |
| 2008/0007811 | A1 | 1/2008 | Lee |
| 2009/0072380 | A1 | 3/2009 | Tarn |
| 2009/0225384 | A1 | 9/2009 | Eiji et al. |
| 2012/0062971 | A1 | 3/2012 | Brown |
| 2012/0162739 | A1 | 6/2012 | Yamada |
| 2012/0180949 | A1 | 7/2012 | Tarn |
| 2012/0251182 | A1 | 10/2012 | Adachi et al. |
| 2012/0307211 | A1 | 12/2012 | Hofmann et al. |

FOREIGN PATENT DOCUMENTS

| | | |
|---|---|---|
| JP | 2005-191313 A | 7/2005 |
| JP | 2006-184905 A | 7/2006 |
| JP | 2007-524112 A | 8/2007 |
| JP | 2008-015486 A | 1/2008 |
| JP | 2009-071209 A | 4/2009 |
| JP | 2010-122412 A | 6/2010 |
| JP | 2011-151357 A | 8/2011 |
| JP | 2013-513828 A | 4/2013 |
| WO | 2004/106221 A2 | 12/2004 |
| WO | 2011/082789 A1 | 7/2011 |

OTHER PUBLICATIONS

U.S. Office Action dated Oct. 20, 2016, issued in U.S. Appl. No. 15/237,247.

Final Office Action issued in U.S. Appl. No. 15/237,247 dated Apr. 13, 2017.

* cited by examiner

OPTICAL DEVICE AND MANUFACTURING METHOD THEREOF

RELATED APPLICATIONS

This application is the U.S. National Phase under 35 U.S.C. §371 of International Application No. PCT/JP2015/000414, filed on Jan. 30, 2015, which in turn claims the benefit of Japanese Application No. 2014-049638, filed on Mar. 13, 2014, the disclosures of which are incorporated by reference herein.

TECHNICAL FIELD

The present disclosure relates to an optical device having an optical element which is placed in a package and has an optically functional surface that is pivotable, and a method of manufacturing the optical device.

BACKGROUND ART

In general, an optical device includes a housing having a recess for housing an optical element, and a lid placed over an opening in the housing. The lid includes a transparent window. The housing and the lid are bonded together by low-melting glass or the like. Another optical device includes a package member for placing an optical element therein, and a metal cap combined with a window. The metal cap is placed on a base board, and the optical element is housed in the metal cap. The metal cap and the base board are jointed together by seam welding. With such structures, conventional optical devices each provide a sealed interior for housing an optical element.

For example, Patent Literature (PTL) 1 and PTL 2 disclose conventional techniques related to the present disclosure.

CITATION LIST

Patent Literature

PTL 1: Japanese Unexamined Patent Application Publication No. 2006-184905
PTL 2: Japanese Unexamined Patent Application Publication No. 2011-151357

SUMMARY OF THE INVENTION

Technical Problem

Unfortunately, in such optical devices, optical elements and optical devices are degraded during the manufacturing processes. Therefore, it is expected to reduce the degradation of optical elements and optical devices.

Solution to Problem

An optical device according to the present disclosure includes: an optical element having an optically functional surface which is pivotable; a base supporting the optical element; and a package housing the optical element and the base, in which the package includes: a wall that surrounds the optical element and the base; a window that closes a first opening defined by the wall, and forms an optical path to the optically functional surface, the window being transmissive to light; and a bottom plate that closes a second opening defined by the wall.

Advantageous Effect of Invention

An optical device according to the present disclosure can reduce degradation of the optical device and an optical element during the manufacturing process.

DESCRIPTION OF EMBODIMENT

An embodiment is described in detail in the following sections with reference to the drawings.

It is to be noted that the following embodiment shows one specific example of the present disclosure. The numerical values, shapes, structural elements, the arrangement and connection of the structural elements etc., shown in the following embodiment are mere examples, and therefore do not limit the present disclosure. As such, among the structural elements in the following embodiment, structural elements not recited in any one of the independent claims which indicate the broadest concepts of the present disclosure are described as arbitrary structural elements.

Embodiment

Figure 1:
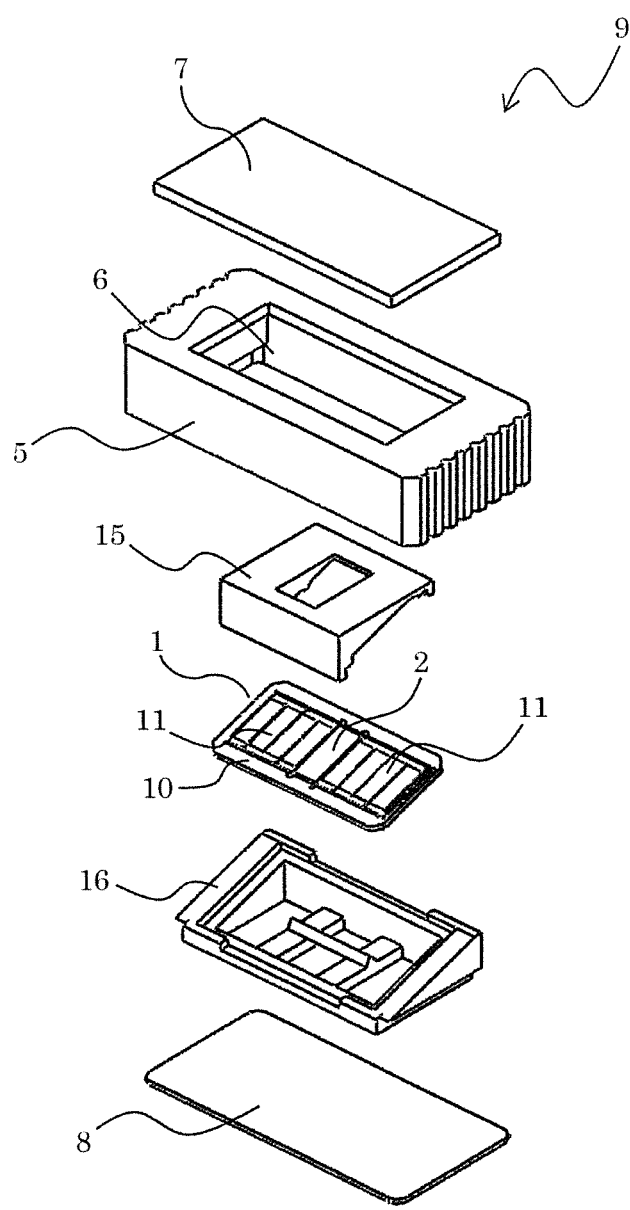
FIG. 1 is an exploded perspective view of an optical device in an embodiment according to the present disclosure.
Figure 2:
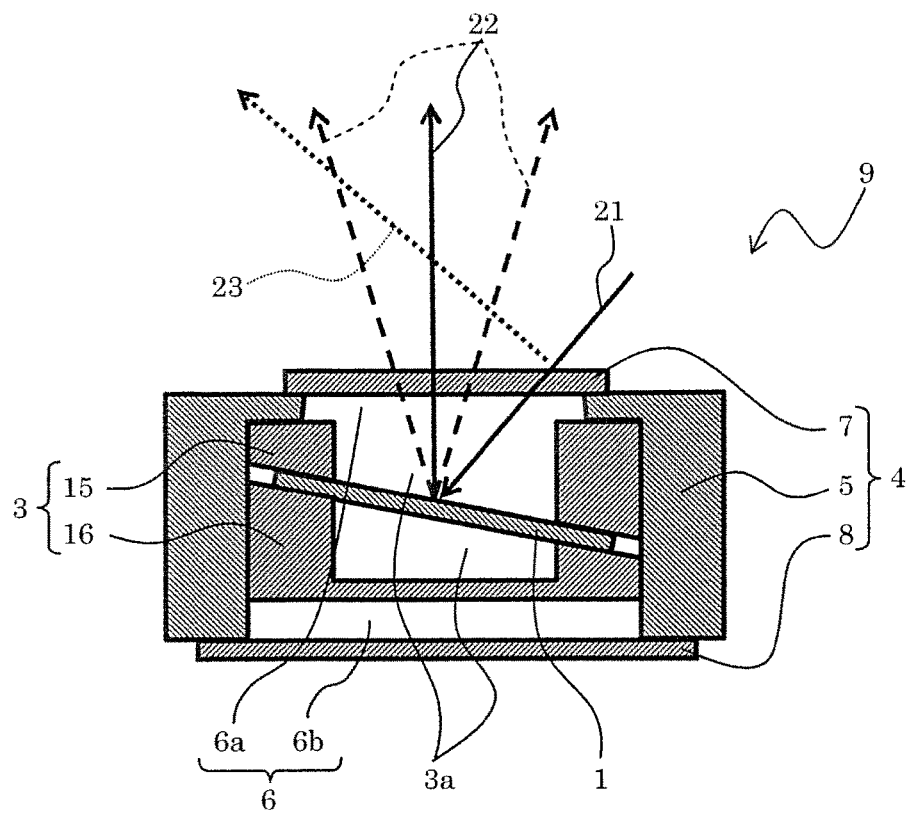
FIG. 2 is a schematic view of a usage state of the optical device according to the present disclosure.

FIG. 1 illustrates optical scanning device 9 as an example of an optical device. FIG. 2 is a schematic view of the usage state of optical scanning device 9. Optical scanning device 9 includes optical element 1 having a pivotable reflective surface in the interior of package 4. Optical scanning device 9 controls the pivot motion of the reflective surface of optical element 1 to control the reflection angle of incoming light 21 entering optical scanning device 9, thereby scanning outgoing light 22 over a predetermined area. Package 4 includes window 7, wall 5, and bottom plate 8.

It is to be noted that optical element 1 is placed in package 4 with base 3 disposed therebetween. This allows optical element 1 to be pivotable.

Next, the structure of optical element 1 is described with reference to FIG. 3. Optical element 1 includes: movable plate 2a having optically functional surface 2; a pair of vibration beams 11 longitudinally disposed along pivot axis 18 of movable plate 2a; and frame-like fixed portion 10 supporting movable plate 2a with the pair of vibration beams 11 disposed therebetween. In other words, vibration beam 11 has a first end supported by fixed portion 10 and a second end connected to movable plate 2a having optically functional surface 2. Optically functional surface 2 is a reflective surface, for example. Vibration beam 11 has a meandering structure in which plural sets of straight portions 11a and folded portions 11b are connected. Each of straight portions 11a is provided with driver 12 for flexurally vibrating straight portion 11a up and down.

It is to be noted that driver 12 is, for example, a layered structure including an upper electrode, a lower electrode, and a piezoelectric layer disposed therebetween (not shown). Driver 12 can flexurally vibrate straight portion 11a up and down by applying a control voltage between the upper electrode and the lower electrode. For example, optical scanning device 9 causes adjacent straight portions 11a to flexurally vibrate in opposite directions by means of drivers 12, thereby causing movable plate 2a to pivot about pivot axis 18. Furthermore, straight portion 11a is provided with monitor 13 disposed side by side with driver 12. Monitor 13 has the same structure as driver 12. Monitor 13 generates a waveform signal from the vibration occurring in straight portion 11a. The generated waveform signal is used for the driving control of movable plate 2a. These drivers 12 and monitors 13 are respectively connected to electrode pads 14a in fixed portion 10 through lines (not shown).

Optical element 1 has a plane structure formed by a MEMS (Micro Electro Mechanical Systems) process. For example, optical element 1 is formed by shaping a Si substrate using dry etching, forming a film using sputtering, forming a pattern using etching, and others.

As shown in FIG. 2, base 3 is provided with recess 3a for providing a space corresponding to a vibration area for vibration beam 11 and movable plate 2a. Base 3 supports optical element 1 through fixed portion 10 located in the circumferential portion of optical element 1. In other words, base 3 is connected to fixed portion 10. In this way, base 3 has a suspension structure allowing the pivot motions of vibration beam 11 and movable plate 2a.

Package 4 includes wall 5 that is tubular and open-ended at both ends, window 7 for closing one of openings 6, and bottom plate 8 for closing the other of openings 6. Optical element 1 and base 3 are housed in package 4. Wall 5 surrounds optical element 1 and base 3. Base 3 is supported by wall 5. Wall 5 is formed of ceramics or the like. Window 7 closes, among openings 6 of wall 5, opening 6a which is located in the optical paths of incoming light 21 and outgoing light 22. Window 7 is provided in the optical path and is transmissive to light. For example, window 7 is formed of optical glass. Wall 5 and window 7 are joined together by low-melting glass. Bottom plate 8 closes, among openings 6 of wall 5, opening 6b which is located opposite window 7. Bottom plate 8 is formed of a metal plate. Bottom plate 8 is combined with the edge face of wall 5 by seam welding. With such a structure, it is possible to enhance the airtightness of the package housing optical element 1 in optical scanning device 9.

A process of closing openings 6 of package 4 includes two steps. One of the steps is to close opening 6a by bonding window 7 and wall 5 together using low-melting glass. The other is to close opening 6b by welding wall 5 and bottom plate 8 together by seam welding. The heat treatment temperature during the bonding step using the low-melting glass is about 600 degrees C. The heat treatment of the bonding step thermally affects whole package 4. On the other hand, the seam welding step is characterized in that the heat treatment temperature is high, but heating points rarely affect the surrounding area because the heating points are an area to be welded. Accordingly, optical scanning device 9 can reduce degradation during the manufacturing process by separating the closing process into two steps.

A method of manufacturing optical scanning device 9 is described in the following sections.

Figure 4:
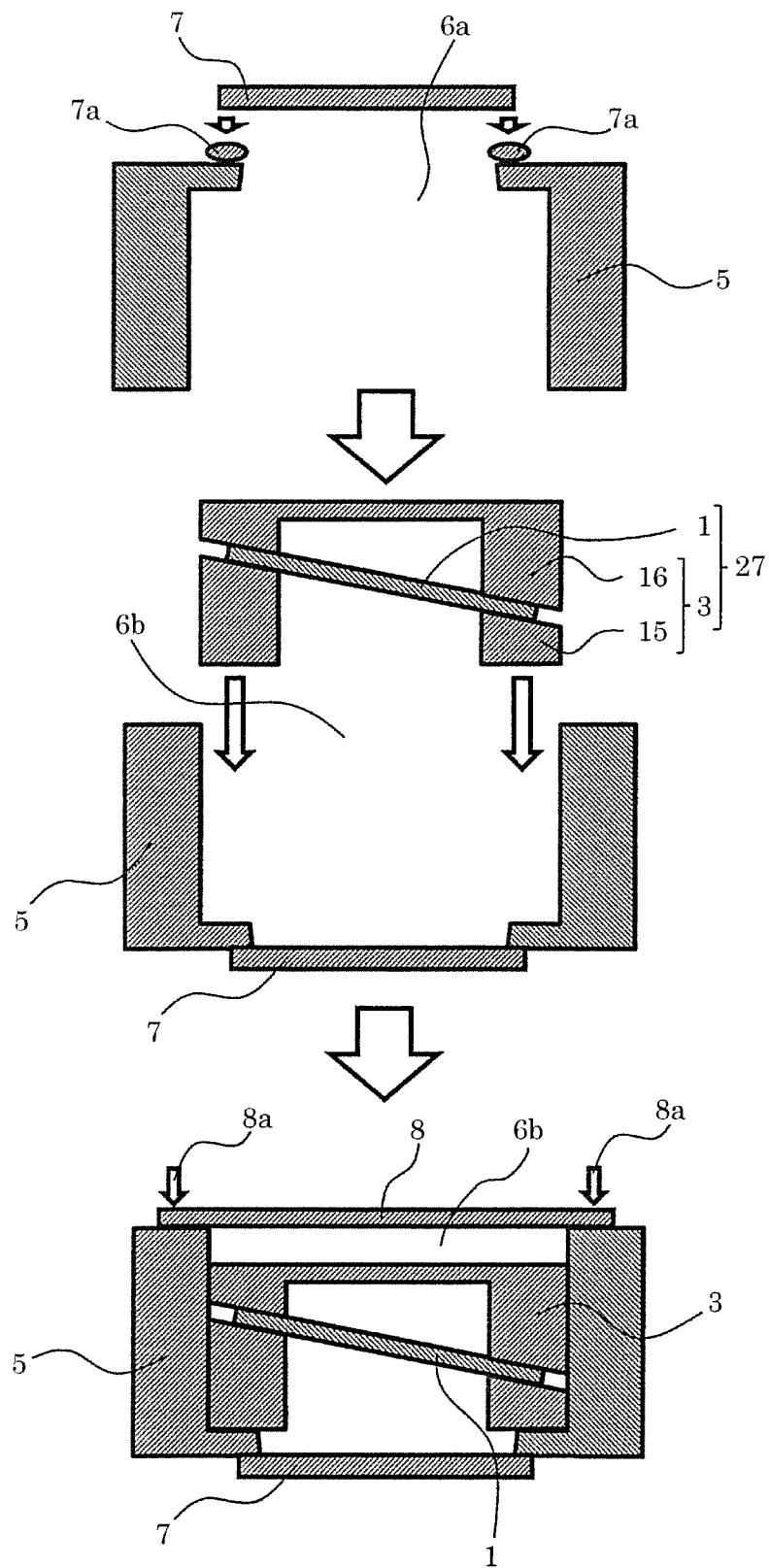
FIG. 4 is a schematic view of a method of manufacturing the optical device according to the present disclosure.

FIG. 4 illustrates a process of closing package 4 of optical scanning device 9.

First, window 7 is placed over opening 6a defined by wall 5. Subsequently, wall 5 and window 7 are bonded together by low-melting glass 7a. In the bonding step, a heat treatment is performed to melt the low-melting glass. Next, optical element 1 and base 3 are combined as assembly 27. Assembly 27 is inserted into wall 5 in which opening 6a is closed by window 7, and assembly 27 and wall 5 are connected to each other. Subsequently, bottom plate 8 is placed over opening 6b defined by wall 5, and bottom plate 8 is combined with the edge face of wall 5 defining opening 6b by seam welding 8a. Thus, the bonding step using low-melting glass 7a, which has a significant thermal effect, is performed before the insertion of optical element 1. Accordingly, it is possible to prevent optical element 1 from being affected by the heat treatment during the bonding step using low-melting glass 7a. After this step, with optical element 1 placed, the closing step by bottom plate 8 is performed by seam welding 8a which has a lower thermal effect. In this way, it is possible to reduce the degradation of optical element 1 in package 4 due to the heat treatment.

It is to be noted that a lead zirconate titanate (PZT) thin film is used as the piezoelectric layer which forms driver 12, for example. The PZT thin film is sensitive to the heat treatment. Accordingly, the foregoing structure can reduce the effect of the heat treatment.

Furthermore, in package 4, window 7 is formed of optical glass, and wall 5 is formed of ceramics. The optical glass and the ceramics have a similar coefficient of thermal expansion. Accordingly, the difference in amount of expansion/shrinkage during the heat treatment between window 7 and wall 5 is small, and thus internal stress remaining after the heat treatment can be reduced. As a result, it is possible to reduce the degradation of optical scanning device 9 due to the heat treatment, such as deformation of window 7 and crack generation caused by the internal stress.

It is to be noted that the difference in amount of expansion/shrinkage during the heat treatment between wall 5 and window 7 is also small in the heat treatment of seam welding 8a as well.

It is to be noted that a metal material such as kovar may be used for wall 5. In this case, however, the difference in amount of heat expansion from the optical glass which forms window 7 becomes large, and thus the thermal shrinkage stress within wall 5 of metal acts on window 7 even in the heat treatment of the seam welding. The thermal shrinkage stress causes poor flatness of window 7 and crack generation in window 7. The poor flatness of window 7 affects an incoming light beam and an outgoing light beam. Furthermore, the crack generation in window 7 causes poor airtightness of package 4. Accordingly, a structure in which the seam welding area of wall 5 is away from the optical glass is required to reduce the effect of the thermal shrinkage stress. In this case, the whole package becomes larger in size, and the cost also increases accordingly.

In this regard, the effect of the thermal shrinkage stress due to the seam welding can be reduced by forming window 7 using optical glass and wall 5 using ceramics. Accordingly, in optical scanning device 9, the distance between the seam welding area and window 7 can be decreased, thereby downsizing the optical scanning device.

Furthermore, optical scanning device 9 has a structure in which optical element 1 is connected to wall 5 via base 3. With such a structure in which the welding area is not in contact with base 3, it is possible to reduce the thermal effect on optical element 1 due to seam welding 8a.

Optical element 1 is provided with a control signal path for providing a control signal to driver 12. In optical scanning device 9, base 3 has a structure divided into first base 15 and second base 16. First base 15 is disposed on a window 7-facing side of optical element 1. First base 15 is supported by wall 5. First base 15 has a light transmissive region at a position corresponding to optically functional surface 2. This region is formed of a light transmissive material. It is to be noted that the light transmissive region may be a through hole provided in the first base. Second base 16 is disposed on a bottom plate 8-facing side of optical element 1. The control signal path leading from optical element 1 to the exterior of package 4 is provided so as to be connected from optical element 1 to wall 5 via second base 16.

An example of combining optical element 1 and base 3 together is described in detail.

Figure 5:
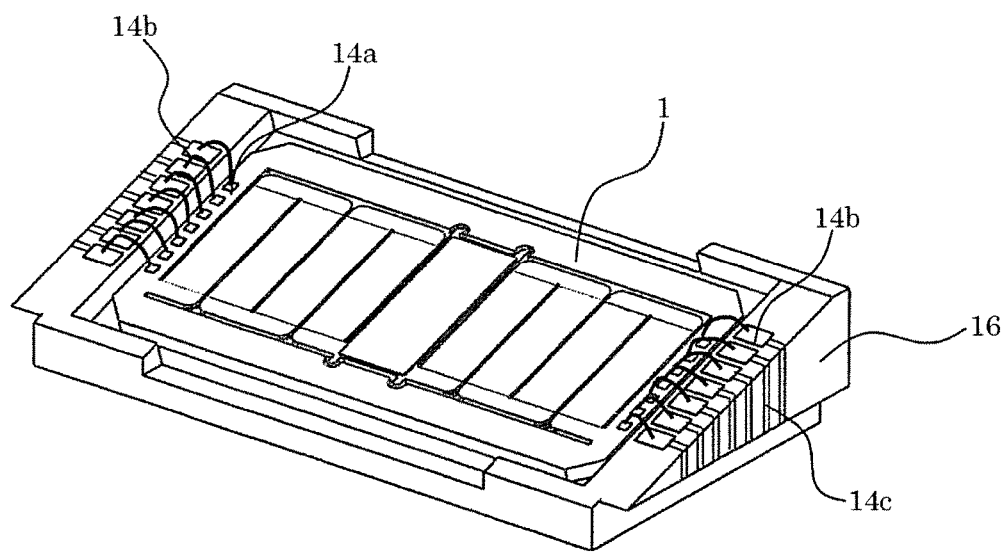
FIG. 5 is a schematic view of a combined structure of a base and the optical element in the optical device according to the present disclosure.

FIG. 5 illustrates a schematic view of a combined structure of optical element 1 and second base 16.

First, optical element 1 is placed on second base 16. Subsequently, electrode pad 14a on optical element 1 and electrode pad 14b on second base 16 are interconnected by wire bonding. Next, first base 15 is placed on second base 16 such that optical element 1 is covered, and base 3 and optical element 1 are combined together as assembly 27. The combined assembly 27 is inserted into wall 5 having window 7 bonded thereto as shown in FIG. 4.

Figure 6:
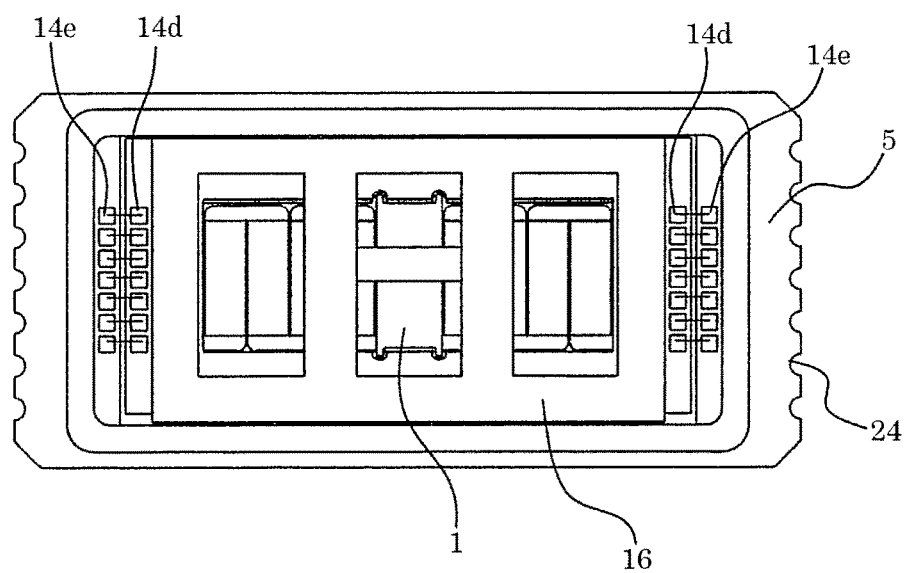
FIG. 6 is a schematic view of an arrangement in which the base according to the present disclosure is placed in a wall.

FIG. 6 is a plan view of wall 5 having assembly 27 inserted thereinto when viewed from opening 6b.

As shown in FIG. 6, in opening 6b of wall 5, electrode pad 14d exposed to the backside is provided on second base 16. Electrode pad 14d is connected to electrode pad 14b via wrapping electrode 14c as shown in FIG. 5. Electrode pad 14e is provided on the inner surface of wall 5. Electrode pad 14d is connected to electrode pad 14e by wire bonding. With such a structure, it is possible to form the control signal path without any complex process by interconnecting the electrode pads. It is to be noted that wall 5 has an inside electrode, but it is not shown. Electrode pad 14e is connected to side electrode 24 provided on the outer peripheral surface of wall 5 via the inside electrode. In this way, the control signal path connected to optical element 1 leads from wall 5 to optical element 1 via second base 16.

Base 3 includes a structure divided into first base 15 and second base 16. Optical element 1 is provided between first base 15 and second base 16. Furthermore, optical element 1 is inclined relative to window 7 as shown in FIG. 2. In other words, optical element 1 and window 7 are non-parallel with each other. More specifically, the interface between base 3 and optical element 1 is not provided in parallel with the incident surface of window 7 for incoming light 21. The interface between base 3 and optical element 1 is formed of dividing faces of base 3. The dividing faces of base 3 indicate an interface between first base 15 and optical element 1, and an interface between second base 16 and optical element 1. When optical element 1 and window 7 are parallel, the direction of surface-reflected light 23 is almost the same as the direction of outgoing light 22 from optical element 1. Accordingly, surface-reflected light 23 appears as noise in a scanning area of outgoing light 22 exiting via optical element 1. Accordingly, it is possible to prevent surface-reflected light 23 from appearing as noise by providing optical element 1 inclined relative to window 7.

Figure 7:
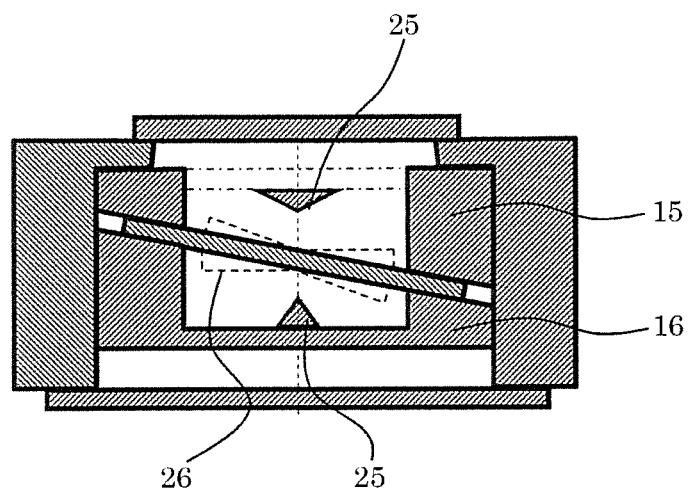
FIG. 7 is a schematic view of a method of restricting the movement of the optical element inside the base according to the present disclosure.

FIG. 7 illustrates a sectional view of a variation of optical scanning device 9.

Optical element 1 is sandwiched between first base 15 and second base 16. Abut portion 25 for restricting the movement of movable plate 2a of optical element 1 is formed on the inner surfaces of first base 15 and second base 16. With this, it is possible to prevent optical element 1 from being damaged by deformed vibration beam 11 due to strong shock or the like. Abut portion 25 is provided without overlapping range of motion 26 such that the pivot motion of movable plate 2a indicated by a dashed line is not blocked. Abut portion 25 is preferably closest to movable plate 2a around pivot axis 18. Furthermore, a minimum necessary space preferably exists around abut portion 25 such that air resistance to the pivot motion of movable plate 2a does not increase and not affect the frequency or amplitude of pivot motion in an area other than the vicinity of pivot axis 18.

Figure 3:
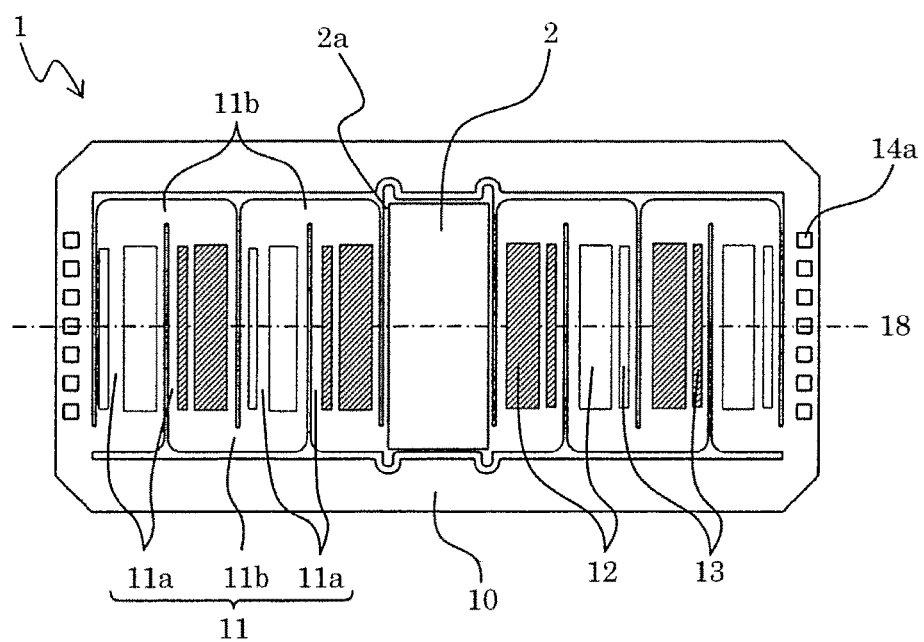
FIG. 3 is a top view of an optical element in the optical device according to the present disclosure.
Figure 8:
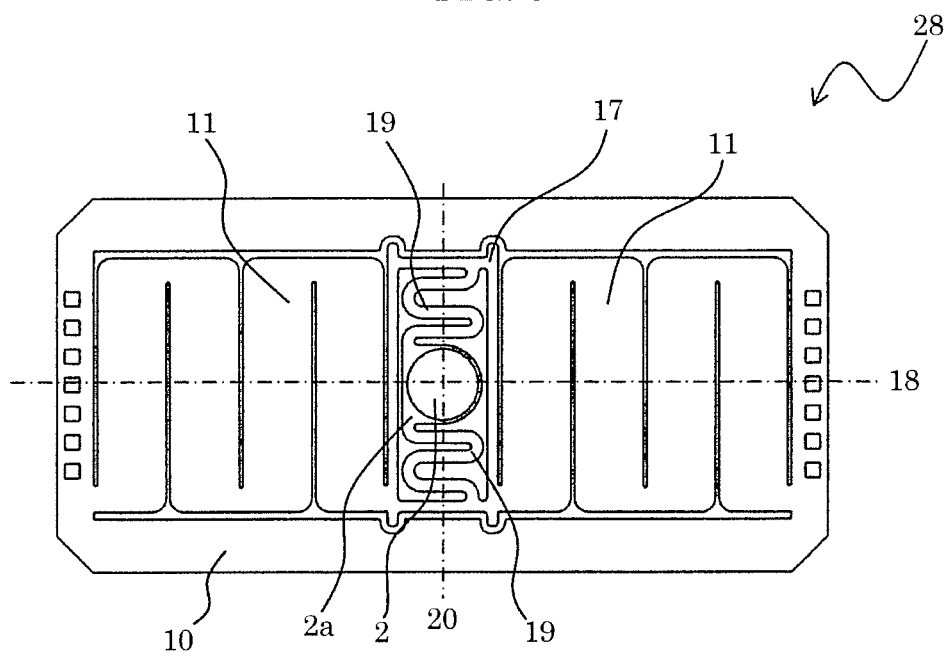
FIG. 8 is a top view of an optical element in another embodiment according to the present disclosure.

It is to be noted that in the foregoing embodiment, a single-axis-based scanning structure in which fixed portion 10 and movable plate 2a, shown in FIG. 3 as optical element 1, are connected through vibration beam 11 extending along pivot axis 18 is described as an example, but the present disclosure is not limited to this embodiment. For example, as shown in FIG. 8, optical scanning device 9 may use an optical element having a two-axis-based scanning structure. Optical element 28 includes movable frame 17 at a position corresponding to movable plate 2a in FIG. 1. Movable frame 17 is connected to vibration beam 11. In this case, vibration beam 11 is referred to as the first vibration beam. Movable frame 17 has second vibration beam 19 and optically functional surface 2 on the inside. Second vibration beam 19 has second pivot axis 20 orthogonal to pivot axis 18. Second vibration beam 19 has the first end connected to movable frame 17 and the second end connected to movable plate 2a. In other words, movable plate 2a is connected to a pair of second vibration beams 19 pivoting about second pivot axis 20. In this case, pivot axis 18 is referred to as the first pivot axis. Movable plate 2a is connected to the inner end of second vibration beam 19. Optically functional surface 2 is disposed on movable plate 2a. First vibration beam 11 includes the first driver, and second vibration beam 19 includes the second driver. The first driver and the second driver each have an upper electrode, a lower electrode, and a piezoelectric layer disposed therebetween. With this structure, it is possible to achieve, as movable plate 2a, the two-axis-based scanning structure formed of a combination of light scanning performed by pivoting about pivot axis 18 by means of outer vibration beam 11; and light scanning performed by pivoting about second pivot axis 20 by means of inner second vibration beam 19. The optical scanning device having this structure also have the same effect as the foregoing. Furthermore, in addition to the effect of downsizing the device by decreasing the distance between the welding area of seam welding 8a and window 7 as described above, in the two-axis-based scanning structure, it is possible to have an effect of reserving the implement area according to the complicated element structure.

Furthermore, in the above embodiment, the optical scanning device including a reflective surface formed on movable plate 2a as optically functional surface 2 is taken as an example, but the present disclosure is not limited to this embodiment. For example, an optical element may include a light sensing surface of a pyroelectric film formed on movable plate 2a as optically functional surface 2. An optical device including the optical element having the light sensing surface can be used as a light sensing device. In this way, the present disclosure is applicable to an optical device including optical element 1 placed in package 4 and having optically functional surface 2 that is pivotable.

As described above, an optical device according to the present embodiment includes: an optical element having an optically functional surface which is pivotable; a base supporting the optical element; and a package housing the optical element and the base, in which the package includes: a wall that surrounds the optical element and the base; a window that closes a first opening defined by the wall, and forms an optical path to the optically functional surface, the window being transmissive to light; and a bottom plate that closes a second opening defined by the wall.

Furthermore, in an aspect of the embodiment, the optical element may includes: a fixed portion connected to the base; a vibration beam having a first end supported by the fixed portion and a second end connected to a movable plate having the optically functional surface; and a driver that vibrates the vibration beam, and the driver may include an upper electrode, a lower electrode, and a piezoelectric layer disposed between the upper electrode and the lower electrode.

Furthermore, in an aspect of the embodiment, the window may be formed of optical glass, the wall may be formed of ceramic, the bottom plate may be formed of a metal plate, the window and the wall may be bonded together by low-melting glass, and the wall and the bottom plate may be welded.

Furthermore, in an aspect of the embodiment, the base may be supported by the wall.

Furthermore, in an aspect of the embodiment, the base may include a structure divided into: a first base disposed on a window-facing side of the optical element; and a second base disposed on a bottom-plate-facing side of the optical element, the first base may be supported by the wall, and a control signal path connected to the optical element may lead from the wall to the optical element via the second base.

Furthermore, in an aspect of the embodiment, an interface between the optical element and the first base or between the optical element and the second base may be non-parallel to the window.

Furthermore, in an aspect of the embodiment, the first base and the second base may restrict a movement of the optical element.

Furthermore, in an aspect of the embodiment, the optically functional surface may be a reflective surface.

Furthermore, in an aspect of the embodiment, the optically functional surface may be a light sensing surface.

Furthermore, in an aspect of the embodiment, the optical element may include: a fixed portion connected to the base; a first vibration beam having a first end connected to the fixed portion and a second end connected to a movable frame; and a first driver that vibrates the first vibration beam, the movable frame may include: a movable plate having the optically functional surface; a second vibration beam having a third end connected to the movable frame and a fourth end connected to the movable plate, and further having a second pivot axis different from a first pivot axis of the first vibration beam; and a second driver that vibrates the second vibration beam, and the first driver and the second driver each may include an upper electrode, a lower electrode, and a piezoelectric layer disposed between the upper electrode and the lower electrode.

Furthermore, a method of manufacturing an optical device according to the present embodiment, including: an optical element having an optically functional surface which is pivotable; a base supporting the optical element; and a package housing the optical element and the base, the package including: a wall that surrounds the optical element and the base; a window that closes a first opening defined by the wall, and forms an optical path to the optically functional surface, the window being transmissive to light; and a bottom plate that closes a second opening defined by the wall, the method including: bonding the window and the wall together by low-melting glass after the window is placed over the first opening defined by the wall; combining the base with the optical element; connecting the base combined with the optical element into the wall combined with the window; and joining the bottom plate and the wall by seam welding after the bottom plate is placed over the second opening defined by the wall, the wall being combined with the window and the base combined with the optical element.

The optical device according to one or more aspects has been described above based on the embodiment above. However, the present disclosure is not limited to the above embodiment. Those skilled in the art would readily appreciate that, without departing from the concept of the present disclosure, various modifications may be made in the above-described embodiment and other embodiments may be obtained by arbitrarily combining structural elements in the above-described embodiment.

INDUSTRIAL APPLICABILITY

The present disclosure is effective in an optical device for use in a vehicle or others.

REFERENCE MARKS IN THE DRAWINGS 1, 28 optical element
2 optically functional surface
2a movable plate
3 base
4 package
5 wall
6 opening
7 window
7a low-melting glass
8 bottom plate
8a seam welding
9 optical scanning device
10 fixed portion
11 vibration beam
12 driver
14a, 14b, 14c, 14d, 14e electrode pad
15 first base
16 second base
17 movable frame
18 pivot axis
19 second vibration beam
20 second pivot axis
21 incoming light
22 outgoing light
23 surface-reflected light
24 side electrode
25 abut portion
26 range of motion

The invention claimed is:
1. An optical device comprising:
an optical element having an optically functional surface which is pivotable; and a base supporting the optical element,
wherein the optical element includes:
- a movable plate having the optically functional surface,
- a vibration beam connected to the movable plate at one end of the vibration beam,
- a driving portion disposed on the optical element,
- a fixed portion connected to another end of the vibration beam, and
- a first electrode pad disposed on an upper surface of the fixed portion and electrically connected to the driving portion, wherein a second electrode pad is disposed on an upper surface of the base, wherein a first line is disposed on an outside surface of the base and electrically connected to the second electrode pad, and wherein the first electrode pad and the second electrode pad are connected by a wire.

2. The optical device according to claim 1, wherein the first line is perpendicular to a lower surface of the base.

3. The optical device according to claim 1, wherein the first electrode pad has a square shape when viewed in plan.

4. The optical device according to claim 1, wherein the second electrode pad has a square shape when viewed in plan.

5. The optical device according to claim 1, wherein a size of the second electrode pad is larger than a size of the first electrode pad when viewed in plan.

6. The optical device according to claim 1, wherein the upper surface of the base is inclined relative to a lower surface of the base.

7. The optical device according to claim 1, wherein an upper surface of the optical element is inclined relative to a lower surface of the base.

8. The optical device according to claim 1, wherein the driving portion is disposed on the vibration beam,
the driving portion includes an electrode and a piezoelectric layer, and
the optical element includes a second line electrically connecting the electrode of the driving portion to the first electrode pad.

9. The optical device according to claim 1, further comprising:
a package housing the optical element and the base.

10. The optical device according to claim 9, wherein the package includes a window which is transmissive to light.

11. An optical device comprising:
an optical element having an optically functional surface which is pivotable; and
a base supporting the optical element,
wherein the optical element includes:
- a movable plate having the optically functional surface,
- a vibration beam connected to the movable plate at one end of the vibration beam,
- a driving portion disposed on the optical element,
- a fixed portion connected to another end of the vibration beam, and
- a first electrode pad disposed on an upper surface of the fixed portion and electrically connected to the driving portion, wherein a second electrode pad is disposed on an upper surface of the base, and wherein the first electrode pad and the second electrode pad are connected by a wire.

12. The optical device according to claim 11, wherein a first line is disposed on an outside surface of the base and connected to the second electrode pad.

13. The optical device according to claim 12, wherein the first line is perpendicular to a lower surface of the base.

14. The optical device according to claim 11, wherein the first electrode pad has a square shape when viewed in plan.

15. The optical device according to claim 11, wherein the second electrode pad has a square shape when viewed in plan.

16. The optical device according to claim 11, wherein a size of the second electrode pad is larger than a size of the first electrode pad when viewed in plan.

17. The optical device according to claim 11, wherein an upper surface of the base is inclined relative to a lower surface of the base.

18. The optical device according to claim 11, wherein an upper surface of the optical element is inclined relative to a lower surface of the base.

19. The optical device according to claim 11, wherein the driving portion is disposed on the vibration beam,
the driving portion includes an electrode and a piezoelectric layer, and
the optical element includes a second line electrically connecting the electrode of the driving portion to the first electrode pad.

20. The optical device according to claim 11, further comprising:
a package housing the optical element and the base.

* * * * *